(12) United States Patent
Furuya

(10) Patent No.: US 12,422,862 B2
(45) Date of Patent: Sep. 23, 2025

(54) SELF-DRIVING DEVICE CONTROL SYSTEM

(71) Applicant: Daifuku Co., Ltd., Osaka (JP)

(72) Inventor: Haruhito Furuya, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 128 days.

(21) Appl. No.: 18/545,485

(22) Filed: Dec. 19, 2023

(65) Prior Publication Data

US 2024/0201702 A1    Jun. 20, 2024

(30) Foreign Application Priority Data

Dec. 20, 2022  (JP) ................. 2022-203374

(51) Int. Cl.
  *G05D 1/617*  (2024.01)
  *G05D 105/20*  (2024.01)
  *G05D 107/70*  (2024.01)
  *G06T 7/70*  (2017.01)
  *G06V 20/52*  (2022.01)
  (Continued)

(52) U.S. Cl.
  CPC .............. *G05D 1/617* (2024.01); *G06T 7/70* (2017.01); *G06V 20/52* (2022.01); *G06V 40/10* (2022.01); *G07C 9/15* (2020.01); *G07C 9/22* (2020.01); *G05D 2105/20* (2024.01); *G05D 2107/70* (2024.01); *G06T 2207/30196* (2013.01);
  (Continued)

(58) Field of Classification Search
  CPC .............. G05D 1/617; G05D 2105/20; G05D 2107/70; G05D 2105/28; G05D 2109/10; G05D 1/6987; G06T 7/70; G06T 2207/30196; G06T 2207/30232; G06T 2207/30242; G06V 20/52; G06V 40/10; G07C 9/15; G07C 9/22; G07C 9/00571; G07C 9/00896; G07C 9/00944; G07C 9/25; G07C 2009/0092; B65G 2207/40; B65G 1/0492
  See application file for complete search history.

(56) References Cited

U.S. PATENT DOCUMENTS

2018/0275664 A1* 9/2018 Fujii .................... G05D 1/0231
2021/0383627 A1* 12/2021 Saito ...................... G06F 21/35
(Continued)

FOREIGN PATENT DOCUMENTS

JP    2015189560 A    11/2015

OTHER PUBLICATIONS

Machine Translation of WO-2019224935 (Year: 2025).*

*Primary Examiner* — Thomas Ingram
(74) *Attorney, Agent, or Firm* — The Webb Law Firm

(57) ABSTRACT

A self-driving device control system of the present invention includes an entry restricted area, at least one entrance opened and closed by a closing member, a self-driving device, and a control device, and further includes an outside identification device, an inside identification device, and a storage device. When identification information is acquired by the outside identification device, the control device sets the self-driving device to a stopped state. If the storage device is not storing even one piece of entry identification information regarding a worker for which a corresponding piece of exit identification information regarding the same worker is not stored in the storage device, and furthermore all of the entrances are in a passage restricted state, the control device resumes the driving of the self-driving device.

7 Claims, 7 Drawing Sheets

(51) Int. Cl.
  *G06V 40/10* (2022.01)
  *G07C 9/15* (2020.01)
  *G07C 9/22* (2020.01)
(52) U.S. Cl.
  CPC ............... *G06T 2207/30232* (2013.01); *G06T 2207/30242* (2013.01)

(56) References Cited

U.S. PATENT DOCUMENTS

2024/0265755 A1\* 8/2024 Carter .................... G06V 20/10
2025/0182430 A1\* 6/2025 Ogatsu ................... G06V 40/19

\* cited by examiner

Fig.3

| ENTRY GATE NUMBER | ID NUMBER | ENTRY IDENTIFICATION INFORMATION ACQUISITION TIME | EXIT GATE NUMBER | ID NUMBER | EXIT IDENTIFICATION INFORMATION ACQUISITION TIME | COMPLETION CHECK |
|---|---|---|---|---|---|---|
| 1 | 003 | 12:05:25 | 3 | 003 | 12:06:14 | ✓ |
| 3 | 005 | 12:06:15 | 3 | 005 | 12:06:55 | ✓ |
| 2 | 001 | 12:06:20 | 3 | 001 | 12:07:30 | ✓ |
| 1 | 006 | 12:06:23 | — | — | — | |

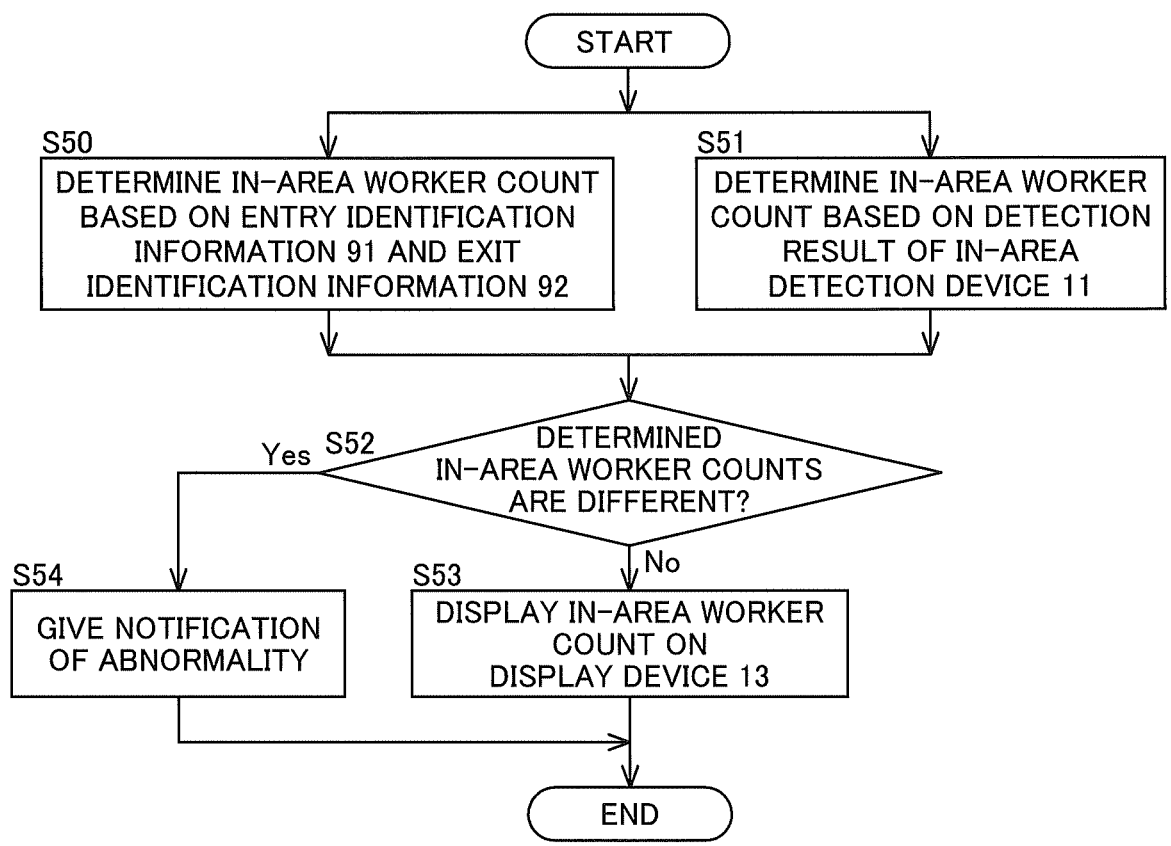

SELF-DRIVING DEVICE CONTROL SYSTEM

CROSS-REFERENCE TO RELATED APPLICATION

This application claims priority to Japanese Patent Application No. 2022-203374 filed Dec. 20, 2022, the disclosure of which is hereby incorporated by reference in its entirety.

BACKGROUND OF THE INVENTION

1. Field of the Invention

The present invention relates to a self-driving device control system that includes an entry restricted area surrounded by an entry restriction member that restricts entry of a worker, at least one entrance provided in a part of the entry restriction member and opened and closed by a closing member, a self-driving device inside the entry restricted area, and a control device that controls the self-driving device.

2. Description of Related Art

A technology related to a self-driving device control system is disclosed in JP 2015-189560A (Patent Document 1), for example. The reference signs shown in parentheses in the following description of related art are the reference signs used in Patent Document 1.

A self-driving device control system (transport vehicle system 1) in Patent Document 1 includes an entry restricted area (travel route 2) surrounded by an entry restriction member (entry protection fence 31) that restricts the entry of a worker (approacher 52), a plurality of entrances (entry ports 34) provided in the entry restriction member and each opened and closed by a closing member (entry door 33), a transport vehicle (3) disposed inside the entry restricted area, a control device (main control device 12) that controls the transport vehicle (3), a plurality of monitoring boxes (22) provided in correspondence with the entrances, and an operation box (21). Each of the monitoring boxes (22) stores a plurality of key mounting sections (24) and a plurality of monitoring keys (25) mounted to the key mounting sections (24). In this self-driving device control system, when an automatic stop button in the operation box (21) is pressed, the control device stops the driving of the transport vehicle (3). Also, when a monitoring key (25) is removed from a key mounting section (24) inside one of the monitoring boxes (22), the control device determines that there is a possibility that a worker is present in the entry restricted area, and does not resume driving of the transport vehicle (3) even if a start button in the operation box (21) is pressed. Furthermore, when a closing member is unlocked with an entry key (39), the control device cuts off the supply of power to the transport vehicle (3).

In a self-driving device control system such as that disclosed in Patent Document 1, in order to enter the entry restricted area, a worker presses the automatic stop button to stop the traveling of the transport vehicle. The worker then removes a monitoring key from one of the key mounting sections, uses an entry key different from the monitoring key to unlock the corresponding closing member, and enters the entry restricted area. As long as the monitoring key has not been returned to the key mounting section, the driving of the transport vehicle is not resumed, even if the start button in the operation box is pressed. Accordingly, while one worker is inside the entry restricted area, even if another worker is not aware of that fact and attempts to resume the driving of the transport vehicle, it is possible to avoid a situation in which the driving of the transport vehicle is resumed. Therefore, the safety of the worker in the entry restricted area can be enhanced. However, with such a self-driving device control system, a worker is required to perform multiple operations and carry multiple keys each time they enter and exit the entry restricted area, thus leading to the problem of the tendency for increased complexity in operations for ensuring worker safety.

SUMMARY OF THE INVENTION

In view of the foregoing, there is desire for the ability to reduce the operational burden on a worker who enters an entry restricted area where a self-driving device is located, while also ensuring the safety of the worker in the entry restricted area.

A self-driving device control system according to an aspect of the present disclosure includes:
- an entry restricted area surrounded by an entry restriction member configured to restrict entry of a worker;
- at least one entrance in a part of the entry restriction member and configured to be opened and closed by a closing member;
- a self-driving device in the entry restricted area; and
- a control device configured to control the self-driving device, wherein the self-driving device control system further includes:
- an outside identification device at the at least one entrance, at a location outside the entry restricted area, and configured to acquire identification information regarding the worker;
- an inside identification device at the at least one entrance, at a location inside the entry restricted area, and configured to acquire the identification information; and
- a storage device configured to store information, in response to the outside identification device acquiring the identification information, the control device stores the acquired identification information as entry identification information in the storage device, sets the self-driving device to a stopped state, sets a state of the closing member to a passage permitted state, in which passage of the worker through the at least one entrance is permitted, and, after the worker passes through the at least one entrance, sets the state of the closing member to a passage restricted state, in which passage of the worker through the at least one entrance is restricted, in response to the inside identification device acquiring the identification information, the control device stores the acquired identification information as exit identification information in the storage device, sets the state of the closing member to the passage permitted state, and, after the worker passes through the at least one entrance, sets the state of the closing member to the passage restricted state, in response to the storage device storing even one piece of the entry identification information regarding the worker for which a corresponding piece of the exit identification information regarding the worker is not stored in the storage device, the control device maintains the stopped state of the self-driving device, and in response to the storage device storing even one piece of the entry identification information regarding the worker for which a corresponding piece of the exit identification information regarding the worker is not stored in the storage device, and furthermore each of the at least one entrance being in the passage restricted state, the control device resumes driving of the self-driving device.

According to this configuration, each time a worker attempts to enter or exit through an entrance, identification information regarding the worker is acquired before permitting the worker to pass through the entrance, thus making it possible to specify each worker who has entered the entry restricted area and each worker who has exited the entry restricted area. Also, by comparing the entry identification information and the exit identification information stored in the storage device, it is possible to reliably specify a worker remaining in the entry restricted area, and also reliably determine that all workers have exited the entry restricted area.

The driving of the self-driving device is resumed on the condition that it was determined that all workers determined to have entered the entry restricted area have exited the entry restricted area, and furthermore on the condition that all of the entrances are in the passage restricted state. Therefore, it is possible to avoid a situation in which the driving of the self-driving device is resumed while a worker remains in the entry restricted area.

In this way, according to this configuration, it is possible to reduce the work burden on a worker who enters the entry restricted area where the self-driving device is located, while also ensuring the safety of the worker in the entry restricted area.

Further features and advantages of the self-driving device control system will become clear from the following description of exemplary and non-restrictive embodiments given with reference to the drawings.

BRIEF DESCRIPTION OF THE DRAWINGS

FIG. 3 is a table showing entry identification information and exit identification information.
FIG. 8 is a control flow diagram.

DESCRIPTION OF THE INVENTION

Below, embodiments of a self-driving device control system will be described with reference to the drawings.

Figure 1:
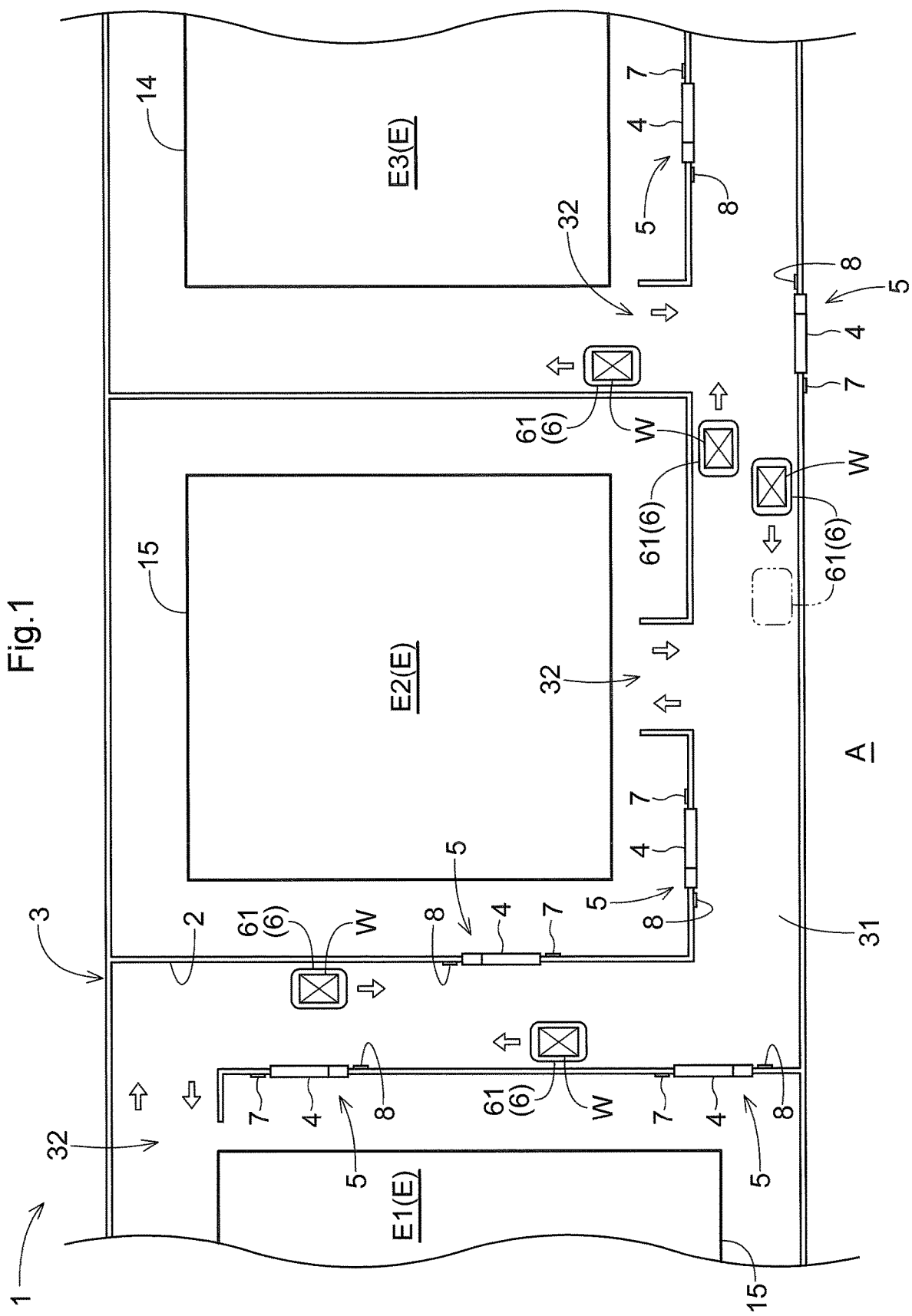
FIG. 1 is an overall plan view of an article transport facility.

As shown in FIG. 1, the self-driving device control system includes an entry restricted area 3 surrounded by an entry restriction member 2 that restricts the entry of a worker, at least one entrance 5 provided in a part of the entry restriction member 2 and opened and closed by a closing member 4, self-driving devices 6 disposed inside the entry restricted area 3, and a control device H that controls the self-driving devices 6. In the present embodiment, the self-driving device control system is applied to an article transport facility 1. For this reason, the entry restricted area 3, the entrances 5, the self-driving devices 6, and the control device H are disposed in the article transport facility 1. In this example, the article transport facility 1 is divided into a plurality of zones E. In the illustrated example, the article transport facility 1 is divided into three zones E, namely a first zone E1, a second zone E2, and a third zone E3. The entry restricted area 3 is arranged so as to connect the zones E.

In the example shown in FIG. 1, the article transport facility 1 includes storage sections 15 that store articles W, and a work area 14 where work related to the articles W is performed. The storage sections 15 and the work area 14 are disposed in separate zones E. Here, the two storage sections 15 are respectively disposed in the first zone E1 and the second zone E2, and the work area 14 is disposed in the third zone E3. The self-driving devices 6 transport the articles W between the work area 14 in the third zone E3 and the storage sections 15 in the first zone E1 and the second zone E2. The articles W may be mechanical parts or completed products obtained by assembling such mechanical parts, for example. In this case, for example, mechanical parts are transported from the storage sections 15 to the work area 14, and completed products are transported from the work area 14 to the storage sections 15. Each of the storage sections 15 includes a plurality of storage shelves (not shown) for the storage of the articles W. Also, the work area 14 includes a product manufacturing line, for example, and is a region where work for, for example, manufacturing a product from mechanical parts is performed.

Note that the articles W may be housed in a container or supported on a pallet or the like while being stored or transported. Also, the articles W are not limited to being mechanical parts or the like, and may be clothes or foodstuffs, for example.

Figure 2:
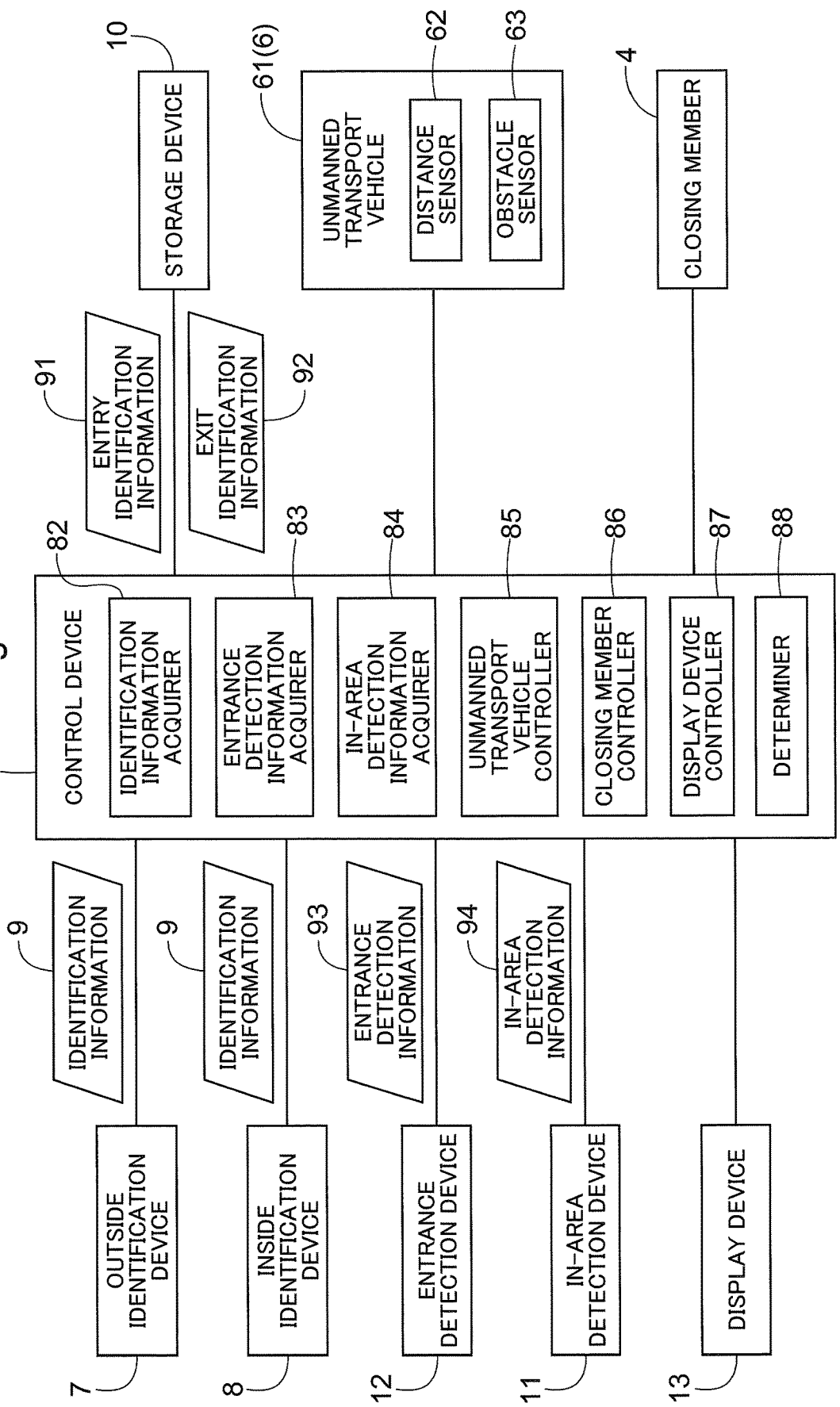
FIG. 2 is a control block diagram.

As shown in FIGS. 1 and 2, in the present embodiment, the self-driving devices 6 include unmanned transport vehicles 61. The unmanned transport vehicles 61 travel along a travel route 31 set inside the entry restricted area 3, and transports the articles W. The unmanned transport vehicles 61 are transport vehicles that travel autonomously. In this example, the unmanned transport vehicles 61 travel along the travel route 31 and transport the articles W to the zones E (here, the first zone E1, the second zone E2, and the third zone E3). In the example shown in FIG. 1, the entirety of the entry restricted area 3 is set as the travel route 31 along which the unmanned transport vehicles 61 travel. A plurality of unmanned transport vehicles 61 can travel on the travel route 31.

In this example, each of the unmanned transport vehicles 61 includes a travel section, a plurality of travel wheels that are provided in the travel section and roll on the floor, and a placement section on which the articles W are placeable. The unmanned transport vehicle 61 causes the travel section to travel by rotating some or all of the travel wheels using driving power from a driving power source such as an electric motor. Also, the unmanned transport vehicle 61 travels while an article W has been placed on the placement section. The placement section is supported from below by the travel section, and is configured to be movable in the up-down direction relative to the travel section. The unmanned transport vehicle 61 transfers the articles W to and from the storage sections 15 and the work area 14 by raising and lowering the placement section. For example, the unmanned transport vehicle 61 raises and lowers the placement section to transfer the articles W to and from loading and unloading sections (e.g., conveyors) provided in the storage sections 15 and the work area 14. Note that the unmanned transport vehicle 61 may transfer the articles W using a conveyor, a fork, or the like.

As shown in FIG. 2, each of the unmanned transport vehicles 61 includes a plurality of sensors. Specifically, the unmanned transport vehicle 61 is provided with sensors for detecting other unmanned transport vehicles 61 located ahead and behind, and sensors for detecting other unmanned transport vehicles 61 located on the left and right sides. In the example shown in FIG. 2, the unmanned transport vehicle 61 includes distance sensors 62 that can measure the inter-vehicle distance to other unmanned transport vehicles 61 ahead and behind, and obstacle sensors 63 for detecting unmanned transport vehicles 61 on the left and right sides. Various known sensors such as a laser sensor and an ultrasonic sensor can be used as such sensors. Note that besides the unmanned transport vehicle 61, the self-driving devices 6 may be any of various devices such as a stacker crane, a conveyor, a picking robot, a manufacturing device, and a processing device.

As described above, the entry restricted area 3 is arranged so as to connect the zones E to each other. In this example, the entry restricted area 3 is arranged along the travel route 31. Also, the entry restricted area 3 is arranged so as to include the travel route 31. The entry restricted area 3 is capable of restricting the entry of a worker into the entry restricted area 3. Specifically, the entry restriction member 2 is arranged so as to surround the entry restricted area 3, thereby restricting the entry of the worker into the entry restricted area 3. Note that in this example, the entry restriction member 2 is formed by a wall member, but may be formed by a fence or the like. In the example shown in FIG. 1, the entirety of the entry restricted area 3 is set as the travel route 31, and the entry restriction member 2 is disposed so as to surround the travel route 31.

In this example, the travel route 31 is wide enough to allow a plurality of unmanned transport vehicles 61 to be arranged side by side. In the example shown in FIG. 1, the travel route 31 is wide enough to allow two unmanned transport vehicles 61 to be adjacent to each other. Access ports 32 are arranged at the junctions between the travel route 31 and the respective zones E (the first zone E1, the second zone E2, and the third zone E3). The unmanned transport vehicles 61 can reach any of the zones E outside the entry restricted area 3 by traveling along the travel route 31 and passing through the corresponding access port 32. Also, the unmanned transport vehicles 61 can enter the entry restricted area 3 (here, the travel route 31) from any of the zones E by passing through the corresponding access port 32. At each of the access ports 32, an opening through which the unmanned transport vehicles 61 can pass is formed in a part of the entry restriction member 2, thus allowing the unmanned transport vehicles 61 to enter and exit the travel route 31 and the corresponding zone E. In the illustrated example, three access ports 32 are provided in correspondence with the three zones E. Note that the heights of the openings formed in the access ports 32 may be set such that only the unmanned transport vehicles 61 can pass through, and a worker cannot (or cannot easily) pass through.

The entrances 5 are locations where a worker can enter and exit the entry restricted area 3. In the present embodiment, the self-driving device control system includes a plurality of entrances 5, and the entrances 5 are each provided in the entry restriction member 2. Although the entry restriction member 2 restricts a worker from entering the entry restricted area 3, the worker can enter the entry restricted area 3 by passing through the entrances 5. In this example, the entrances 5 are provided in correspondence with the zones E. In this way, the worker can move between the zones E by passing through the entrances 5 and the entry restricted area 3. In the example shown in FIG. 1, a worker region A, which is different from the zones E, is provided in the article transport facility 1, and an entrance 5 is also provided for the worker region A. The worker can move between the zones E and the worker region A by passing through the entrances 5 and the entry restricted area 3. Here, an office where workers can do office work or can wait, for example, is provided in the worker region A. In the illustrated example, the entirety of the travel route 31 is the entry restricted area 3. Therefore, a worker travels between the zones E and the worker region A by traveling along the travel route 31.

A closing member 4 is attached to each of the entrances 5. In this example, the closing member 4 includes a locking mechanism that switches between a locked state, in which the closing member 4 is maintained in the closed state and restricted from opening and closing, and an unlocked state, in which the closing member 4 can be freely opened and closed, and furthermore, when the closing member 4 is in the unlocked state, the worker can pass through the corresponding entrance 5. Also, in the locked state, the worker is restricted from passing through the entrance 5. Note that the locking mechanism is automatic, and is controlled by the control device H (specifically, a later-described closing member controller 86). Here, the closing member 4 is a hinged door, and when in the locked state, a worker cannot open the door of the closing member 4. When in the unlocked state, the worker can open the door of the closing member 4. Note that besides a hinged door, the closing member 4 may be constituted by a sliding door, a shutter, a gate with double doors, or the like.

As shown in FIGS. 1, 2, and 3, an outside identification device 7 is provided at each of the entrances 5, at a location outside the entry restricted area 3, and acquires identification information 9 regarding workers. In the present embodiment, an outside identification devices 7 is provided at each of the entrances 5. The outside identification devices 7 are arranged adjacent to the corresponding entrances 5. In the example shown in FIG. 1, the outside identification devices 7 are attached to the entry restriction member 2.

Each of the outside identification devices 7 acquires identification information 9 regarding a worker who is to pass through the corresponding entrance 5 from outside the entry restricted area 3. The outside identification device 7 includes an identification information reader. The outside identification device 7 acquires the identification information 9 using the identification information reader. In this example, the identification information reader is an ID card reader, and reads an ID card presented to the outside identification device 7 by a worker. The outside identification device 7 acquires the identification information 9 in this way. Note that the identification information reader may be a biometric information reader for reading a facial image, a fingerprint, an iris, or the like. The identification information 9 acquired by the outside identification device 7 is stored as entry identification information 91 in a later-described storage device 10. In the example shown in FIG. 3, the entry identification information 91 includes a gate number of the gate through which the worker intends to enter (a number indicating an entrance 5), an ID number that specifies the worker (an example of the identification information 9), and the time when the identification information 9 was acquired (entry identification information acquisition time).

As shown in FIGS. 1, 2, and 3, an inside identification device 8 is provided at each of the entrances 5, at a location inside the entry restricted area 3, and acquires identification information 9. In the present embodiment, an inside identification devices 8 is provided at each of the entrances 5. The inside identification devices 8 are arranged adjacent to the corresponding entrances 5. In the example shown in FIG. 1, the inside identification devices 8 are attached to the entry restriction member 2.

Each of the inside identification devices 8 acquires identification information 9 regarding a worker who intends to pass through the corresponding entrance 5 from inside the entry restricted area 3. The basic configuration of the inside identification device 8 is the same as that of the outside identification device 7, and therefore a description thereof will be omitted. The identification information 9 acquired by the inside identification device 8 is stored as exit identification information 92 in the later-described storage device 10. In the example shown in FIG. 3, the exit identification information 92 includes a gate number of the gate through which the worker intends to exit, an ID number that specifies the worker, and the time when the identification information 9 was acquired (exit identification information acquisition time). In the present embodiment, the outside identification devices 7 and the inside identification devices 8 are able to communicate with the control device H, and transmit the acquired identification information 9 to the control device H.

As shown in FIG. 2, the self-driving device control system further includes an in-area detection device 11 that detects the presence or absence of a worker in the entry restricted area 3. In this example, the in-area detection device 11 detects a worker who has entered the entry restricted area 3. The in-area detection device 11 is able to communicate with the control device H, and transmits, to the control device H, in-area detection information 94 that includes the number of workers present in the entry restricted area 3 (hereinafter sometimes referred to as the in-area worker count). The in-area detection device 11 includes a plurality of image capturing devices arranged in the entry restricted area 3 and an image recognition device. Images throughout the entirety of the entry restricted area 3 are captured by the image capturing devices, and the number of workers present in the entry restricted area 3 is detected from the captured pieces of image information. It is preferable that the image capturing devices and the image recognition device have a moving object detection function. Note that the in-area detection device 11 may also be an infrared or ultrasonic human sensor. Also, the in-area detection device 11 may have a configuration in which, for example, a plurality of beacon receivers are provided in the entry restricted area 3, and the number of workers in the entry restricted area 3 can be specified by beacon transmitters on the workers.

As shown in FIG. 2, the self-driving device control system further includes an entrance detection device 12 that detects workers passing through the entrances 5. In this example, the entrance detection device 12 detects workers passing through each of the entrances 5. The entrance detection device 12 is able to communicate with the control device H, and transmits, to the control device H, entrance detection information 93 that includes the number of workers who passed through each of the entrances 5. The entrance detection device 12 includes a plurality of image capturing devices arranged at the entrances 5, and an image recognition device. Images of the entrances 5 are captured by the image capturing devices, and the number of workers who passed through each of the entrances 5 is detected from the captured pieces of image information. It is preferable that the image capturing devices and the image recognition device have a moving object detection function. Note that the entrance detection device 12 may also be an infrared or ultrasonic human sensor.

As shown in FIG. 2, the self-driving device control system further includes the storage device 10 that stores information. In the present embodiment, the storage device 10 is able to communicate with the control device H. The storage device 10 stores at least the entry identification information 91 and the exit identification information 92. The control device H acquires identification information 9 from the outside identification devices 7 with use of an identification information acquirer 82, and stores such information as the entry identification information 91 in the storage device 10, and also acquires identification information 9 from the inside identification devices 8 with use of the identification information acquirer 82, and stores such information as the exit identification information 92 in the storage device 10. In the example shown in FIG. 2, one storage device 10 is provided, but a configuration may also be adopted in which a storage device 10 is provided at each of the entrances 5. Note that the storage device 10 may be included in the control device H as a storage section.

In the present embodiment, as shown in FIG. 2, the control device H controls the unmanned transport vehicles 61, the outside identification devices 7, the inside identification devices 8, the entrance detection device 12, the in-area detection device 11, the closing members 4, the storage device 10, and a later-described display device 13. The control device H includes an arithmetic processing unit such as a CPU and peripheral circuits such as a memory, and functions of the control device H are realized through cooperation between such hardware and a program executed on the hardware (e.g., the arithmetic processing unit). Instead being constituted by one piece of hardware, the control device H may be configured by a collection of pieces of hardware (separate pieces of hardware) that can communicate with each other.

The control device H includes: the identification information acquirer 82 that acquires pieces of the identification information 9 from the outside identification devices 7 and the inside identification devices 8 and also acquires stored pieces of the identification information 9 (entrance identification information 91 and exit identification information 92) from the storage device 10; an entrance detection information acquirer 83 that acquires the entrance detection information 93 from the entrance detection device 12; an in-area detection information acquirer 84 that acquires the in-area detection information 94 from the in-area detection device 11; an unmanned transport vehicle controller 85 that controls the unmanned transport vehicles 61; a closing member controller 86 that controls the closing members 4; a display device controller 87 that controls the display device 13; and a determiner 88 by which the control device H makes determinations. Hereinafter, control executed when a worker enters the entry restricted area 3 will be described in detail.

Figure 4:
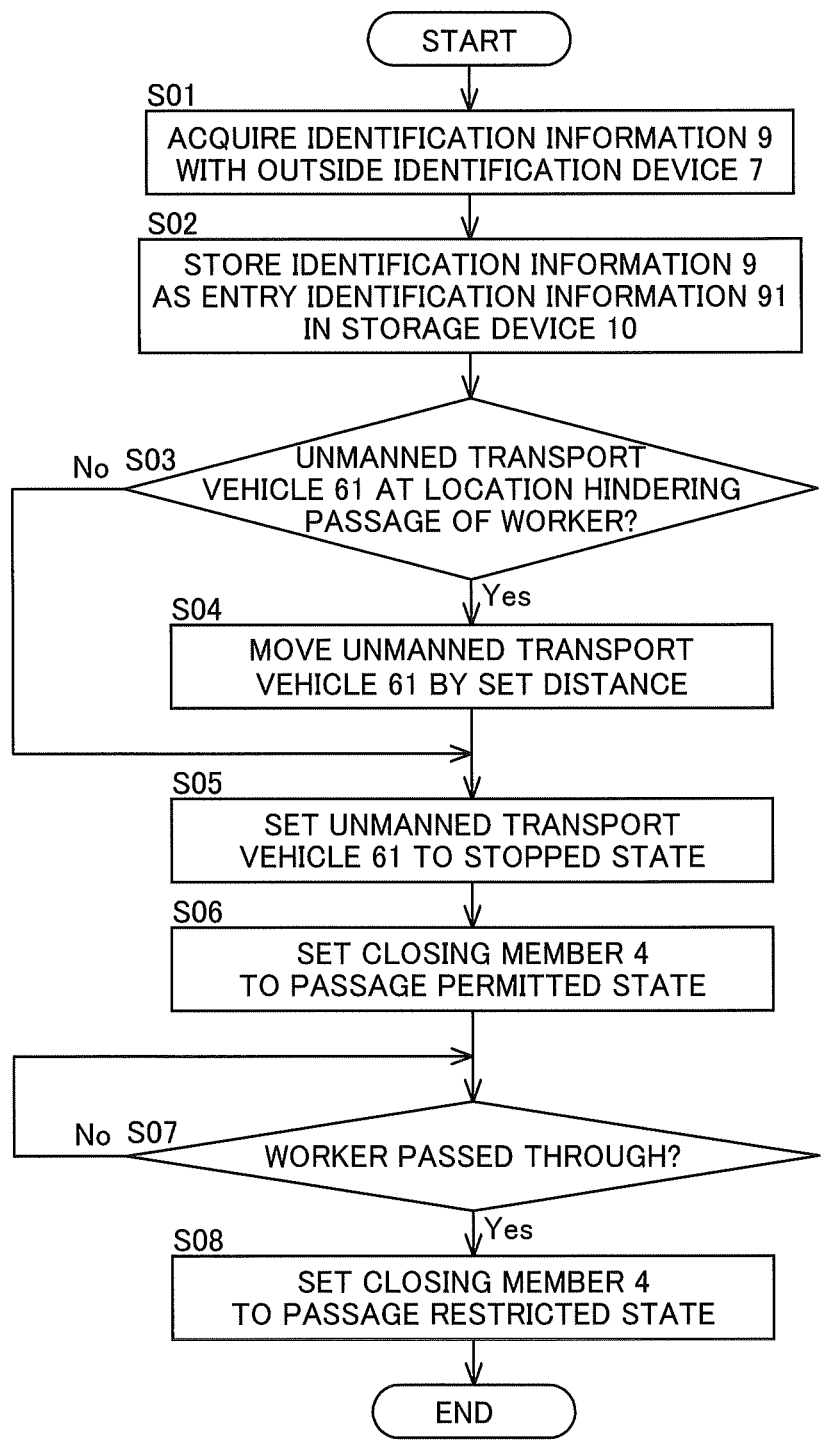
FIG. 4 is a control flow diagram.

As shown in FIGS. 2 and 4, when one of the outside identification devices 7 acquires a piece of identification information 9, the control device H stores the identification information 9 as the entry identification information 91 in the storage device 10, sets the self-driving devices 6 to a stopped state, and sets the state of the corresponding closing member 4 to a passage permitted state, in which passage of the worker through the corresponding entrance 5 is permitted, and then, after the worker passes through the entrance 5, sets the state of the closing member 4 to a passage restricted state, in which passage of the worker through the entrance 5 is restricted. In the present embodiment, when the identification information acquirer 82 acquires the piece of identification information 9 from the outside identification device 7 and stores the identification information 9 as the entry identification information 91 in the storage device 10, the unmanned transport vehicle controller 85 sets all of the unmanned transport vehicles 61 that are traveling in the entry restricted area 3 (here, the travel route 31) to the stopped state. Also, the closing member controller 86 switches the corresponding closing member 4 from the locked state to the unlocked state. Accordingly, the closing member 4 enters the passage permitted state, and thus the worker can open the door of the closing member 4 and pass through the entrance 5. Note that in the case where the unmanned transport vehicles 61 are already stopped because another worker has already entered the entry restricted area 3, when the outside identification device 7 acquires a piece of the identification information 9 from another worker, the control device H continues to maintain the stopped state of the unmanned transport vehicles 61. Also, in the present embodiment, when a worker enters the entry restricted area 3 and then the door of the closing member 4 is closed, the closing member controller 86 switches that closing member 4 from the unlocked state to the locked state, and sets the state of the closing member 4 to the passage restricted state. Here, the door of the closing member 4 is automatically closed by a door closer. Note that in the present embodiment, as described above, the control device H stores the identification information 9 as the entry identification information 91 in the storage device 10, then sets the unmanned transport vehicles 61 to the stopped state, and then sets the state of the closing member 4 to the passage permitted state. However, the order in which the above control steps are performed by the control device H can be changed as appropriate. For example, the control device H may store the entry identification information 91, then set the state of the closing member 4 to the passage permitted state, and then set the unmanned transport vehicles 61 to the stopped state.

As shown in FIGS. 2 and 4, in the present embodiment, when a piece of the identification information 9 is acquired by one of the outside identification devices 7, the control device H sets an unmanned transport vehicle 61 to the stopped state on the condition that the unmanned transport vehicle 61 is at a location other than a location hindering the passage of the worker. Specifically, when the piece of the identification information 9 is acquired by the outside identification device 7, if an unmanned transport vehicle 61 is at location hindering the passage of the worker, the control device H causes that unmanned transport vehicle 61 to move to a location not hindering the passage of the worker, and then sets the unmanned transport vehicle 61 to the stopped state. Hereinafter, the control performed by the control device H to move an unmanned transport vehicle 61 to a location not hindering the passage of a worker may be simply referred to as "position correction control".

In this example, if a plurality of unmanned transport vehicles 61 are at locations separated by an inter-vehicle distance smaller than a set distance in the traveling direction of the unmanned transport vehicles 61, the control device H determines that those unmanned transport vehicles 61 are at locations hindering the passage of a worker, and executes the position correction control. Specifically, if the determiner 88 determines that a plurality of unmanned transport vehicles 61 are at locations hindering the passage of a worker, the unmanned transport vehicle controller 85 causes at least one of those unmanned transport vehicles 61 to travel such that the inter-vehicle distance is the set distance or longer. Note that it is preferable that, before executing the position correction control, the unmanned transport vehicle controller 85 stops the unmanned transport vehicles 61 that are not to be subjected to position correction control (the unmanned transport vehicles 61 that were determined to be at a location other than a location hindering the passage of a worker). In this example, the unmanned transport vehicle controller 85 acquires position information regarding each of the unmanned transport vehicles 61 from the detection information acquired by the distance sensors 62 and the obstacle sensors 63 provided in the corresponding unmanned transport vehicle 61, and calculates the inter-vehicle distance.

In the example shown in FIG. 1, even in the case of unmanned transport vehicles 61 that are traveling in adjacent lanes, if the inter-vehicle distance therebetween in the traveling direction is smaller than the set distance, the determiner 88 determines that such unmanned transport vehicles 61 are at locations hindering the passage of a worker. The illustrated example shows the case where two unmanned transport vehicles 61 are at adjacent positions in adjacent lanes. The inter-vehicle distance between these two unmanned transport vehicles 61 in the traveling direction is smaller than the set distance. For this reason, the unmanned transport vehicle controller 85 executes the position correction control and causes one of the two adjacent unmanned transport vehicles 61 to travel such that the inter-vehicle distance therebetween is greater than or equal to the set distance (two-dot chain line in FIG. 1). Accordingly, it is possible to avoid the case where the movement of the worker who entered the entry restricted area 3 is hindered by the stopped unmanned transport vehicles 61.

It is preferable that the set distance is a distance sufficient for one worker to pass through the entry restricted area 3 (here, the travel route 31) without coming into contact with the stopped unmanned transport vehicles 61. Also, it is preferable that, if the determiner 88 determines that, as a result of executing the position correction control, the inter-vehicle distance from another unmanned transport vehicle 61 not subjected to position correction control has become smaller than the set distance, the unmanned transport vehicle controller 85 executes the position correction control again.

Note that if the unmanned transport vehicles 61 are able to communicate with each other and can thus determine the positions of other unmanned transport vehicles 61, the control device H may acquire the position information from the unmanned transport vehicles 61 and calculate the inter-vehicle distances between the unmanned transport vehicles 61. Also, the control device H may acquire position information regarding the unmanned transport vehicles 61 from the in-area detection device 11 (the image capturing devices and the image recognition device) and calculate the inter-vehicle distances. Furthermore, if a retreat area different from the travel route 31 is provided in the entry restricted area 3, when an unmanned transport vehicle 61 is at a location hindering the passage of a worker, the unmanned transport vehicle controller 85 may cause that unmanned transport vehicle 61 to travel to the retreat area.

As shown in FIG. 4, in the present embodiment, the control device H sets the state of a closing member 4 to the passage permitted state, in which the passage of a worker through the corresponding entrance 5 is permitted, on the condition that the unmanned transport vehicles 61 are in the stopped state. In this example, the control device H sets the closing member 4 to the passage permitted state on the condition that all of the unmanned transport vehicles 61 in the entry restricted area 3 are in the stopped state. Also, if the position correction control needs to be executed, the control device H sets the closing member 4 to the passage permitted state after execution of the position correction control is complete. More specifically, when the determiner 88 determines that all of the unmanned transport vehicles 61 in the entry restricted area 3 are in the stopped state, the closing member controller 86 sets the closing member 4 to the passage permitted state. Also, in the case where the unmanned transport vehicle controller 85 executes the position correction control, the closing member controller 86 sets the closing member 4 to the passage permitted state after execution of the position correction control is complete.

Figure 5:
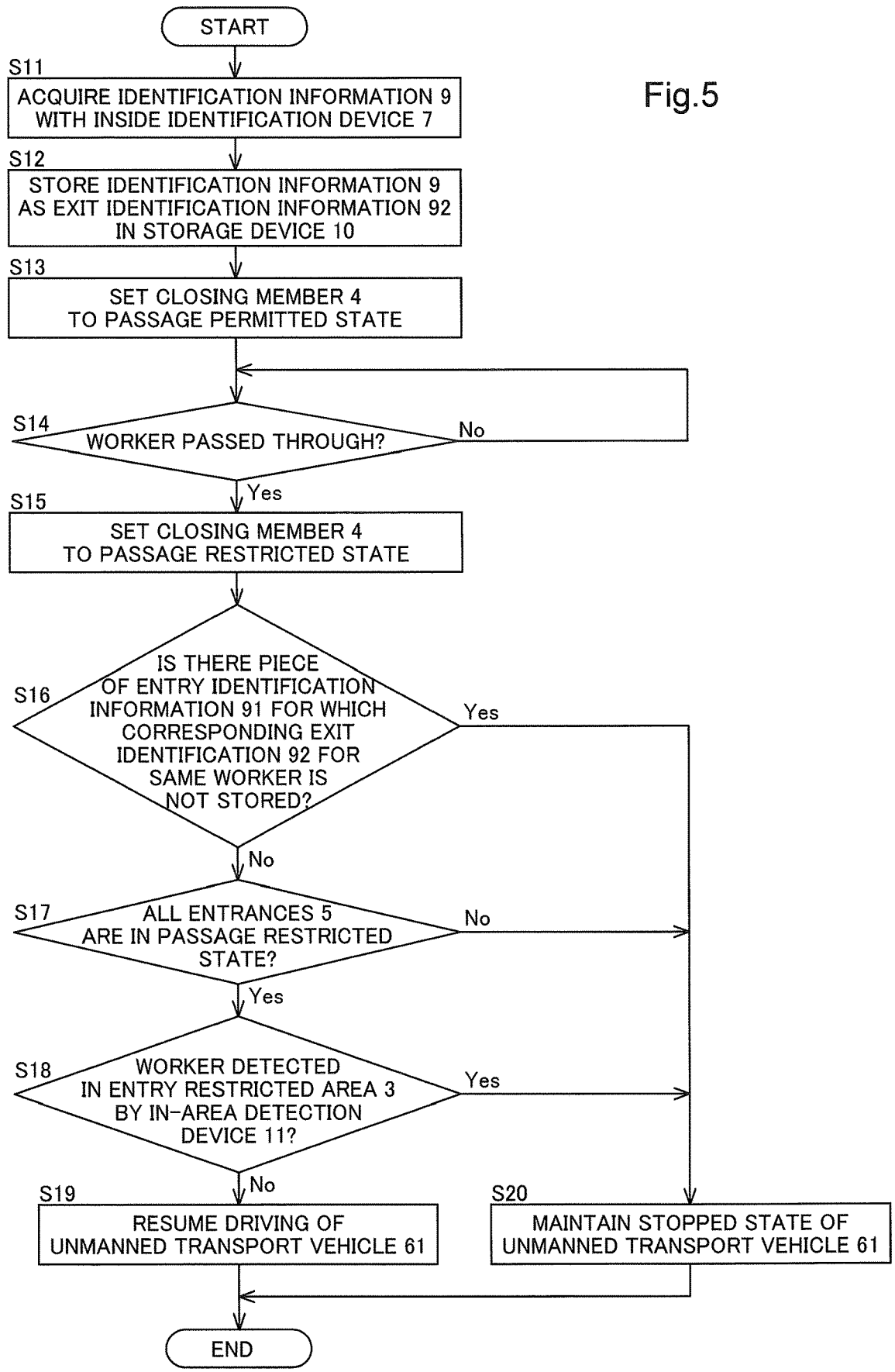
FIG. 5 is a control flow diagram.

Next, control executed when a worker exits the entry restricted area 3 will be described in detail. As shown in FIG. 5, when one of the inside identification devices 8 acquires a piece of identification information 9, the control device H stores the identification information 9 as the exit identification information 92 in the storage device 10, and sets the state of the corresponding closing member 4 to the passage permitted state, and then, after the worker passes through the entrance 5, sets the state of the closing member 4 to the passage restricted state. In the present embodiment, when the identification information acquirer 82 acquires the piece of identification information 9 from the inside identification device 8 and stores the identification information 9 as the exit identification information 92 in the storage device 10, the closing member controller 86 switches the corresponding closing member 4 from the locked state to the unlocked state. Accordingly, the closing member 4 enters the passage permitted state, and thus the worker can open the door of the closing member 4 and pass through the entrance 5, and can move from the entry restricted area 3 (here, the travel route 31) to the outside of entry restricted area 3. After the worker passes through the entrance 5, the door of the closing member 4 is automatically closed as described above, and the closing member 4 enters the passage restricted state. Note that in the present embodiment, as described above, the control device H stores the identification information 9 as the exit identification information 92 in the storage device 10, and then sets the state of the closing member 4 to the passage permitted state, but the control device H may set the state of the closing member 4 to the passage permitted state before storing the identification information 9 as the exit identification information 92 in the storage device 10.

Next, control executed when resuming the driving of the self-driving devices 6 will be described. As shown in FIGS. 3 and 5, if there is even one piece of entry identification information 91 for which a corresponding piece of exit identification information 92 for the same worker is not stored in the storage device 10, the control device H maintains the stopped state of the self-driving devices 6. In the present embodiment, the control device H references the storage device 10 and searches for entry identification information 91 for which a corresponding piece of exit identification information 92 for the same worker is not stored. If even one piece of such exit identification information 92 exists, the control device H determines that a worker is in the entry restricted area 3, and maintains the stopped state for all of the unmanned transport vehicles 61 in the entry restricted area 3. Also, in the present embodiment, the control device H determines the in-area worker count, which is the number of workers in the entry restricted area 3, based on the entry identification information 91 and the exit identification information 92 stored in the storage device 10. Upon finding one or more pieces of entry identification information 91 for which a corresponding piece of exit identification information 92 for the same worker is not stored as described above, the control device H determines the in-area worker count based on the assumption that the number of workers in the entry restricted area 3 is the same as the number of found pieces of entry identification information 91. On the other hand, if a corresponding piece of exit identification information 92 for the same worker is stored for a piece of entry identification information 91, the control device H determines that the corresponding worker has exited the entry restricted area 3. A more specific description of this will be given below with reference to FIG. 3.

As shown in FIG. 3, in the present embodiment, the control device H stores the entry identification information 91 and the exit identification information 92 for each of the entrances 5 in the storage device 10 in such a manner that the entry identification information 91 and the exit identification information 92 can be cross-referenced with each other. In this example, by cross-referencing the entry identification information 91 with the exit identification information 92 for a certain worker, the control device H can determine which one of the entrances 5 that worker passed through in order to enter the entry restricted area 3 and also which one of the entrances 5 that worker passed through in order to exit the entry restricted area 3. Also, by cross-referencing the entry identification information 91 with the exit identification information 92, the control device H can determine the time when a certain worker entered the entry restricted area 3 (here, the time when the entry identification information 91 was acquired) and the time when that worker left the entry restricted area 3 (here, the time when the exit identification information 92 was acquired).

In the example shown in FIG. 3, the entry identification information 91 for a certain worker and a corresponding piece of exit identification information 92 are stored in the storage device 10 in association with each other. Here, each of the entrances 5 is indicated by a different number (gate number). Furthermore, each worker who passes through an entrance 5 is also indicated by a different number (ID number). If a corresponding piece of exit identification information 92 is stored for a piece of entry identification information 91 for a certain worker, the control device H deletes that piece of entry identification information 91 and the corresponding piece of exit identification information 92 from the storage device 10. In the illustrated example, the control device H deletes the pieces of entry identification information 91 and a corresponding piece of exit identification information 92 for the workers with the ID numbers "1", "3", and "5", for which a mark is present for the completion check. As a result, the control device H determines that the workers with the ID numbers "1", "3", and "5" have exited the entry restricted area 3. Also, due to deleting the pieces of entry identification information 91 and the corresponding pieces of exit identification information 92 from the storage device 10 in this way, when a certain worker repeatedly enters and exits the entry restricted area 3, it is possible to prevent the control device H from mistakenly determining that a past piece of exit identification information 92 for that worker is a current piece of exit identification information 92.

Furthermore, in the example shown in FIG. 3, a piece of entry identification information 91 related to the worker with the ID number "6" is stored, but a corresponding piece of exit identification information 92 is not stored. In this way, if only a piece of entry identification information 91 is stored, and a corresponding piece of exit identification information 92 is not stored, a mark is not present for the completion check. In this way, the control device H searches for a piece of entry identification information 91 for which a mark is not present for the completion check. If there is even one piece of entry identification information 91 for which a mark is not present for the completion check (i.e., if there is even one piece of entry identification information 91 for which a corresponding piece of exit identification information 92 is not stored), the control device H (here, the unmanned transport vehicle controller 85) performs control to maintain the stopped state of the unmanned transport vehicles 61 to prevent them from traveling. In the example shown in FIG. 3, the control device H references the piece of entry identification information 91 related to the worker with the ID number "6" for which a mark is not present for the completion check. Then, the determiner 88 determines that the worker with the ID number "6" has not exited the entry restricted area 3, and also determines that one worker is in the entry restricted area 3. In this way, by searching the storage device 10 for pieces of entry identification information 91 for which corresponding pieces of exit identification information 92 are not stored, the control device H can specify every worker who is in the entry restricted area 3 and also the number of such workers (i.e., the in-area worker count). In the present embodiment, the control device H gives a notification indicating the in-area worker count. In this example, as shown in FIG. 2, when the in-area worker count is determined by the determiner 88, the display device controller 87 causes the display device 13 to display the in-area worker count. The display device 13 may be a monitor connected to the control device H. A plurality of such display devices 13 may be provided inside and outside the entry restricted area 3, and may be provided in each of the zones E and the worker region A. As another example, the in-area worker count can also be displayed on a mobile terminal in the possession of a worker.

As shown in FIG. 5, the control device H resumes driving of the self-driving devices 6 on the condition that there is not even one piece of entry identification information 91 for which a corresponding piece of exit identification information 92 for the same worker is not stored in the storage device 10, and furthermore that all of the entrances 5 are in the passage restricted state. In the present embodiment, if there is not even one piece of entry identification information 91 for which a corresponding piece of exit identification information 92 for the same worker is not stored, the control device H determines that all of the workers have exited the entry restricted area 3. The control device H resumes the driving of the self-driving devices 6 on the condition that it was determined that all of the workers have exited the entry restricted area 3, and furthermore that all of the entrances 5 are in the passage restricted state. Also, in the present embodiment, the control device H resumes the driving of the self-driving devices 6 on the additional condition that the in-area detection device 11 has not detected a worker in the entry restricted area 3. More specifically, if the determiner 88 determines that all of the workers have exited the entry restricted area 3, the closing members 4 of all of the entrances 5 are in the locked state, and furthermore the in-area detection device 11 has not detected a worker in the entry restricted area 3, then the unmanned transport vehicle controller 85 resumes the driving of all stopped unmanned transport vehicles 61 in the entry restricted area 3 (here, the travel route 31). Note that the conditions for resuming the driving of the unmanned transport vehicles 61 can also include the condition that none of the unmanned transport vehicles 61 have stopped abnormally, and the condition that an emergency stop command has not been transmitted to any of the unmanned transport vehicles 61, for example.

Figure 6:
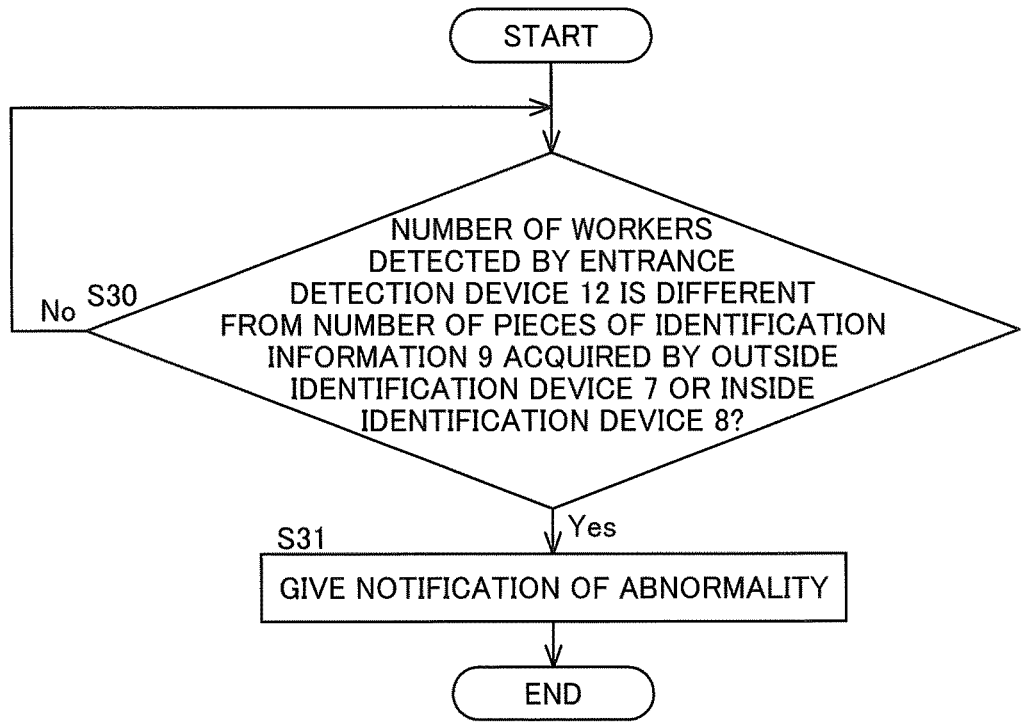
FIG. 6 is a control flow diagram.

As shown in FIG. 6, if the number of workers detected by the entrance detection device 12 is different from the number of pieces of identification information 9 acquired by the outside identification device 7 or the inside identification device 8, the control device H gives a notification indicating an abnormality. In this example, the determiner 88 compares the entrance detection information 93 acquired from the entrance detection device 12 with the identification information 9 (entry identification information 91 or exit identification information 92), and determines whether or not the number of workers detected by the entrance detection device 12 is different from the number of pieces of identification information 9. The determiner 88 makes this determination for each of the entrances 5. When the control device H acquires a piece of identification information 9 corresponding to an entrance 5 through which a worker enters or exits, the control device H acquires corresponding entrance detection information 93 that was detected during a certain period (e.g., about 1 second) before and after the time when the identification information 9 was acquired, for comparison. For example, in the case where one piece of identification information 9 was acquired at a certain entrance 5, if the control device H (here, the determiner 88) detects that two workers passed through that entrance 5 based on the entrance detection information 93 detected in a certain period before and after the time when the piece of identification information 9 was acquired, the control device H gives a notification indicating an abnormality. In the example shown in FIG. 2, the display device controller 87 causes the display device 13 (here, a monitor connected to the control device H) to display information indicating the abnormality. Here, information indicating the abnormality is also displayed on the display device 13 that displays the in-area worker count. A plurality of such display devices 13 may be provided inside and outside the entry restricted area 3, and may be provided in each of the zones E and the worker region A. Also, information indicating the abnormality may be displayed on a mobile terminal in the possession of a worker. Also, the abnormality may be notified by outputting a warning sound or speech. Here, the information indicating the abnormality is information indicating a system error, for example.

Figure 7:
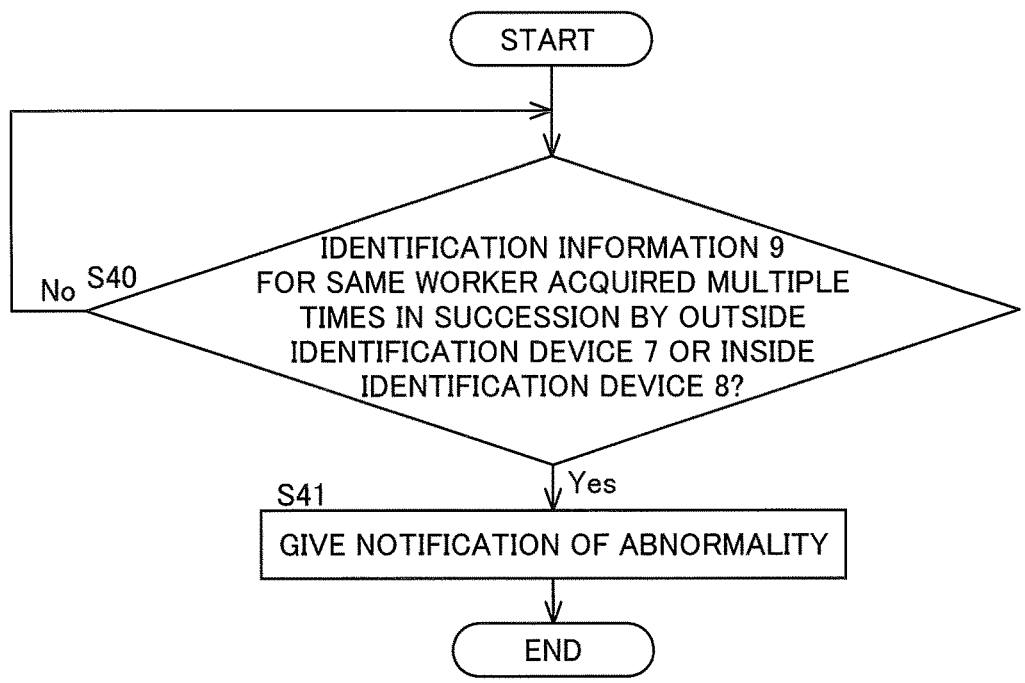
FIG. 7 is a control flow diagram.

Furthermore, in the present embodiment, as shown in FIG. 7, if identification information 9 for the same worker is acquired a plurality of times in succession by the outside identification device 7, or if identification information 9 for the same worker is acquired a plurality of times in succession by the inside identification device 8, the control device H gives a notification indicating an abnormality. In this example, if entry identification information 91 for the same worker is acquired a plurality of times (here, two times) in succession by the outside identification device 7, or if exit identification information 92 for the same worker is acquired a plurality of times (here, two times) in succession by the inside identification device 8, the control device H gives a notification indicating an abnormality. In the example shown in FIG. 2, the display device controller 87 causes the display device 13 (here, a monitor connected to the control device H) to display information indicating the abnormality. Here, the information indicating the abnormality is also displayed on the display device 13 that displays the in-area worker count. A plurality of such display devices 13 may be provided inside and outside the entry restricted area 3, and may be provided in each of the zones E and the worker region A. Also, information indicating the abnormality may be displayed on a mobile terminal in the possession of a worker. Also, the abnormality may be notified by outputting a warning sound or speech.

In the present embodiment, as shown in FIG. 8, if the determiner 88 determines that the in-area worker count determined based on the entry identification information 91 and the exit identification information 92 is different from the in-area worker count detected by the in-area detection device 11, the control device H gives a notification indicating an abnormality. In this example, the control device H references the storage device 10, and if the in-area worker count determined by searching for pieces of entry identification information 91 not having a corresponding piece of exit identification information 92 is different from the in-area worker count determined based on the in-area detection information 94, the control device H gives a notification indicating an abnormality. In the example shown in FIG. 2, the display device controller 87 causes the display device 13 (here, a monitor connected to the control device H) to display information indicating the abnormality. Here, the information indicating the abnormality is also displayed on the display device 13 that displays the in-area worker count. A plurality of such display devices 13 may be provided inside and outside the entry restricted area 3, and may be provided in each of the zones E and the worker region A. Also, information indicating the abnormality may be displayed on a mobile terminal in the possession of a worker. Also, the abnormality may be notified by outputting a warning sound or speech. In this way, even if an erroneous number of workers in the entry restricted area 3 is determined due to a reading error regarding the identification information 9, for example, the accurate number of workers in the entry restricted area 3 can be determined by the in-area detection device 11, and information indicating an abnormality (e.g., error information) can be easily presented.

Hereinafter, control performed by the control device H will be described with reference to the flowcharts of FIGS. 4 to 8.

As shown in FIG. 4, when a piece of identification information 9 is acquired by an outside identification device 7 (S01), the control device H stores the identification information 9 as the entry identification information 91 in the storage device 10 (S02). Then, in a case of determining that at least one of the unmanned transport vehicles 61 is at a location hindering the passage of a worker in the entry restricted area 3 (S03: Yes), the control device H executes the position correction control to cause the at least one unmanned transport vehicle 61 to travel a set distance (S04), and then sets all of the unmanned transport vehicles 61 in the entry restricted area 3 to the stopped state (S05). On the other hand, in a case of determining that none of the unmanned transport vehicles 61 are at a location hindering the passage of a worker in the entry restricted area 3 (S03: No), the control device H sets all of the unmanned transport vehicles 61 in the entry restricted area 3 to the stopped state (S05) without executing the position correction control. After setting all of the unmanned transport vehicles 61 in the entry restricted area 3 to the stopped state (S05), the control device H sets the corresponding closing member 4 to the passage permitted state (S06). Subsequently, in a case of determining that the worker has passed through the corresponding entrance 5 (S07: Yes), the control device H sets the closing member 4 to the passage restricted state (S08).

As shown in FIG. 5, when a piece of identification information 9 is acquired by an inside identification device 8 (S11), the control device H stores the identification information 9 as the exit identification information 92 in the storage device 10 (S12). Then, the control device H sets the corresponding closing member 4 to the passage permitted state (S13). Subsequently, in a case of determining that the worker has passed through the corresponding entrance 5 (S14: Yes), the control device H sets the closing member 4 to the passage restricted state (S15). Then, in the case of determining that there is no entry identification information 91 for which a corresponding piece of exit identification information 92 for the same worker is not stored (S16: No), also determining that all of the entrances 5 are in the passage restricted state (S17: Yes), and also determining that the in-area detection device 11 has not detected a worker in the entry restricted area 3 (S18: No), the control device H resumes the driving of all of the unmanned transport vehicles 61 in the entry restricted area 3 (S19). On the other hand, in the case of determining that there is entry identification information 91 for which a corresponding piece of exit identification information 92 for the same worker is not stored (S16: Yes), or determining that there is an entrance 5 that is not in the passage restricted state (S17: No), or determining that the in-area detection device 11 has detected a worker in the entry restricted area 3 (S18: Yes), the control device H controls the unmanned transport vehicles 61 so as to maintain the stopped state of all of the unmanned transport vehicles 61 in the entry restricted area 3 (S20). Hereinafter, control by which the control device H gives a notification indicating an abnormality will be described with reference to FIGS. 6 to 8.

As shown in FIG. 6, if the number of workers detected by the entrance detection device 12 is different from the number of pieces of identification information 9 acquired by the outside identification device 7 or the inside identification device 8 (S30: Yes), the control device H gives a notification indicating an abnormality (S31). Also, as shown in FIG. 7, in a case of determining that identification information 9 for the same worker was acquired a plurality of times in succession by the outside identification device 7 and the inside identification device 8 (S40: Yes), the control device H gives a notification indicating an abnormality (S41). Furthermore, as shown in FIG. 8, the control device H determines the in-area worker count based on the entry identification information 91 and the exit identification information 92 (S50). The control device H also determines the in-area worker count based on the detection result of the in-area detection device 11 (S51). In a case of determining that the determined in-area worker counts are different from each other (S52: Yes), the control device H gives a notification indicating an abnormality (S54). On the other hand, in a case of determining that the determined in-area worker counts are not different from each other (S52: No), the control device H displays the in-area worker count on the display device 13 (S53).

OTHER EMBODIMENTS

Next, other embodiments of the self-driving device control system will be described.

(1) In the above embodiment, the entry restricted area 3 is arranged so as to connect a plurality of zones E in which the storage sections 15 and the work area 14 are arranged. However, the present invention is not limited to this configuration, and a configuration is possible in which, for example, the entry restricted area 3 is made up of one zone E, and the storage sections 15 and the work area 14 are arranged in the one zone E.

(2) In the above embodiment, an example is described in which a plurality of entrances 5 are provided in the entry restriction member 2. However, the present invention is not limited to such a configuration, and a configuration is possible in which only one entrance 5 is provided in the entry restriction member 2.

(3) In the above embodiment, an example is described in which the control device H resumes the driving of the self-driving devices 6 on the additional condition that the in-area detection device 11 has not detected a worker in the entry restricted area 3, but the present invention is not limited to this. For example, the fact that the in-area detection device 11 has not detected a worker in the entry restricted area 3 is not required to be a condition for the control device H to resume the driving of the self-driving devices 6.

(4) In the embodiment described above, an example is described in which the control device H gives a notification indicating an abnormality if the number of workers detected by the entrance detection device 12 is different from the number of pieces of identification information 9 acquired by the outside identification device 7 or the inside identification device 8, but the present invention is not limited to this. For example, a configuration is possible in which the control device H does not compare the number of workers detected by the entrance detection device 12 with the number of pieces of identification information 9 acquired by the outside identification device 7 or the inside identification device 8.

(5) In the above embodiment, an example is described in which the control device H gives a notification indicating an abnormality if identification information 9 for the same worker was acquired a plurality of times in succession by the outside identification device 7, or if identification information 9 for the same worker was acquired a plurality of times in succession by the inside identification device 8, but the present invention is not limited to this. For example, a configuration is possible in which the control device H gives a notification indicating an abnormality if either only identification information 9 for the same worker was acquired a plurality of times in succession by the outside identification device 7, or only identification information 9 for the same worker was acquired a plurality of times in succession by the inside identification device 8. Note that it is preferable that if entry identification information 91 or exit identification information 92 for the same worker was acquired a plurality of times in succession, the control device H deletes the redundantly stored pieces of entry identification information 91 or exit identification information 92 from the storage device 10.

(6) In the above embodiment, an example is described in which the control device H determines the in-area worker count, which is the number of workers in the entry restricted area 3, based on the entry identification information 91 and the exit identification information 92 stored in the storage device 10, but the present invention is not limited to this. For example, a configuration is also possible in which the control device H determines the in-area worker count based only on the in-area detection information 94 acquired from the in-area detection device 11. Also, in the case where only one entrance 5 is provided, the control device H may determine the in-area worker count based only on the entrance detection information 93 acquired from the entrance detection device 12.

(7) In the above embodiment, an example is described in which, when a piece of the identification information 9 is acquired by one of the outside identification devices 7, the control device H sets an unmanned transport vehicle 61 to the stopped state on the condition that the unmanned transport vehicle 61 is at a location other than a location hindering the passage of a worker, but the present invention is not limited to this. For example, such a condition does not need to be set as a condition on which the control device H sets an unmanned transport vehicle 61 to the stopped state.

(8) It should be noted that the configurations disclosed in each of the above-described embodiments can also be applied in combination with configurations disclosed in other embodiments (including combinations between embodiments described as other embodiments) as long as no contradiction arises. Regarding such other configurations as well, the embodiments disclosed in this specification are merely examples in all respects. Therefore, various modifications can be made as appropriate without departing from the gist of the present disclosure.

Overview of Embodiments

The following describes an overview of the self-driving device control system described above.

A self-driving device control system according to an aspect of the present disclosure includes:
an entry restricted area surrounded by an entry restriction member configured to restrict entry of a worker;
at least one entrance in a part of the entry restriction member and configured to be opened and closed by a closing member;
a self-driving device in the entry restricted area; and
a control device configured to control the self-driving device,
wherein the self-driving device control system further includes:
an outside identification device at the at least one entrance, at a location outside the entry restricted area, and configured to acquire identification information regarding the worker;
an inside identification device at the at least one entrance, at a location inside the entry restricted area, and configured to acquire the identification information; and
a storage device configured to store information,
in response to the outside identification device acquiring the identification information, the control device stores the acquired identification information as entry identification information in the storage device, sets the self-driving device to a stopped state, sets a state of the closing member to a passage permitted state, in which passage of the worker through the at least one entrance is permitted, and, after the worker passes through the at least one entrance, sets the state of the closing member to a passage restricted state, in which passage of the worker through the at least one entrance is restricted,
in response to the inside identification device acquiring the identification information, the control device stores the acquired identification information as exit identification information in the storage device, sets the state of the closing member to the passage permitted state, and, after the worker passes through the at least one entrance, sets the state of the closing member to the passage restricted state,
in response to the storage device storing even one piece of the entry identification information regarding the worker for which a corresponding piece of the exit identification information regarding the worker is not stored in the storage device, the control device maintains the stopped state of the self-driving device, and
in response to the storage device storing even one piece of the entry identification information regarding the worker for which a corresponding piece of the exit identification information regarding the worker is not stored in the storage device, and furthermore each of the at least one entrance being in the passage restricted state, the control device resumes driving of the self-driving device.

According to this configuration, each time a worker attempts to enter or exit through an entrance, identification information regarding the worker is acquired before permitting the worker to pass through the entrance, thus making it possible to specify each worker who has entered the entry restricted area and each worker who has exited the entry restricted area. Also, by comparing the entry identification information and the exit identification information stored in the storage device, it is possible to reliably specify a worker remaining in the entry restricted area, and also reliably determine that all workers have exited the entry restricted area.

The driving of the self-driving device is resumed on the condition that it was determined that all workers determined to have entered the entry restricted area have exited the entry restricted area, and furthermore on the condition that all of the entrances are in the passage restricted state. Therefore, it is possible to avoid a situation in which the driving of the self-driving device is resumed while a worker remains in the entry restricted area.

In this way, according to this configuration, it is possible to reduce the work burden on a worker who enters the entry restricted area where the self-driving device is located, while also ensuring the safety of the worker in the entry restricted area.

Here, it is preferable that the at least one entrance includes a plurality of entrances, and
 the control device stores the entry identification information and the exit identification information for each of the entrances in the storage device in such a manner that the entry identification information and the exit identification information are cross-referenceable with each other.

According to this configuration, even if a worker exits through an entrance different from the entrance through which the worker entered, it is possible to appropriately determine the entry of the worker into the entry restricted area and the exit of the worker from the entry restricted area.

Also, it is preferable that the self-driving device control system further includes: an in-area detection device configured to detect whether the worker is in the entry restricted area,
 wherein in response to the in-area detection device not detecting that the worker is in the entry restricted area, the control device resumes driving of the self-driving device.

According to this configuration, even if a piece of entry identification information fails to be stored in the storage device by mistake, such as the case where a worker passes through an entrance together with another worker, it is possible to avoid a situation where the driving of the self-driving device is resumed while a worker remains in the entry restricted area. Therefore, it is possible to further improve the safety of workers in the entry restricted area.

Also, it is preferable that the self-driving device control system further includes: an entrance detection device configured to detect a worker count indicating how many workers passed through the at least one entrance,
 wherein in response to the worker count detected by the entrance detection device being different from how many pieces of the identification information were acquired by the outside identification device or the inside identification device, the control device gives a notification indicating an abnormality.

According to this configuration, even if a piece of entry identification information or exit identification information fails to be stored in the storage device by mistake, such as the case where a worker passes through an entrance together with another worker, it is possible to avoid the case where an erroneous determination is made based on such a situation.

Also, it is preferable that in response to the identification information regarding the worker being acquired a plurality of times in succession by the outside identification device, or in response to the identification information regarding the worker being acquired a plurality of times in succession by the inside identification device, the control device gives a notification indicating an abnormality.

According to this configuration, even if a piece of identification information is erroneously read a plurality of times in succession by the outside identification device or the inside identification device, it is possible to avoid the case where erroneous entry identification information or erroneous exit identification information is stored in the storage device, thus making it possible to avoid the case where an erroneous determination is made based on such identification information.

Also, it is preferable that the control device is further configured to determine an in-area worker count, which indicates how many workers are in the entry restricted area, based on the entry identification information and the exit identification information stored in the storage device, and give a notification indicating the in-area worker count.

According to this configuration, each worker can easily become aware of the total number of workers in the entry restricted area.

Also, it is preferable that the self-driving device is an unmanned transport vehicle,
 in response to the identification information being acquired by the outside identification device, and furthermore the unmanned transport vehicle being at a location other than a location hindering passage of the worker, the control device sets the unmanned transport vehicle to the stopped state, and
 in response to setting the unmanned transport vehicle to the stopped state, the control device sets the state of the closing member to the passage permitted state, in which passage of the worker through the at least one entrance is permitted.

According to this configuration, it is possible to prevent the passage of a worker in the entry restricted area from being hindered by the unmanned transport vehicle, thereby making it easier for the worker to pass through the entry restricted area.

The self-driving device control system according to the present disclosure need only be able to achieve at least one of the above-described effects.

What is claimed is:
1. A self-driving device control system, comprising:
 an entry restricted area surrounded by an entry restriction member configured to restrict entry of a worker;
 at least one entrance in a part of the entry restriction member and configured to be opened and closed by a closing member;
 a self-driving device in the entry restricted area; and
 a control device configured to control the self-driving device, and
 wherein:
 the self-driving device control system further comprises:
 an outside identification device at the at least one entrance, at a location outside the entry restricted area, and configured to acquire identification information regarding the worker;

an inside identification device at the at least one entrance, at a location inside the entry restricted area, and configured to acquire the identification information; and a storage device configured to store information, in response to the outside identification device acquiring the identification information, the control device stores the acquired identification information as entry identification information in the storage device, sets the self-driving device to a stopped state, sets a state of the closing member to a passage permitted state, in which passage of the worker through the at least one entrance is permitted, and, after the worker passes through the at least one entrance, sets the state of the closing member to a passage restricted state, in which passage of the worker through the at least one entrance is restricted, in response to the inside identification device acquiring the identification information, the control device stores the acquired identification information as exit identification information in the storage device, sets the state of the closing member to the passage permitted state, and, after the worker passes through the at least one entrance, sets the state of the closing member to the passage restricted state, in response to the storage device storing even one piece of the entry identification information regarding the worker for which a corresponding piece of the exit identification information regarding the worker is not stored in the storage device, the control device maintains the stopped state of the self-driving device, and in response to the storage device storing even one piece of the entry identification information regarding the worker for which a corresponding piece of the exit identification information regarding the worker is not stored in the storage device, and furthermore each of the at least one entrance being in the passage restricted state, the control device resumes driving of the self-driving device.

2. The self-driving device control system according to claim 1, wherein the at least one entrance includes a plurality of entrances, and wherein the control device stores the entry identification information and the exit identification information for each of the entrances in the storage device in such a manner that the entry identification information and the exit identification information are cross-referenceable with each other.

3. The self-driving device control system according to claim 1, further comprising:

an in-area detection device configured to detect whether the worker is in the entry restricted area, and wherein in response to the in-area detection device not detecting that the worker is in the entry restricted area, the control device resumes driving of the self-driving device.

4. The self-driving device control system according to claim 1, further comprising:

an entrance detection device configured to detect a worker count indicating how many workers passed through the at least one entrance, and wherein in response to the worker count detected by the entrance detection device being different from how many pieces of the identification information were acquired by the outside identification device or the inside identification device, the control device gives a notification indicating an abnormality.

5. The self-driving device control system according to claim 1, wherein in response to the identification information regarding the worker being acquired a plurality of times in succession by the outside identification device, or in response to the identification information regarding the worker being acquired a plurality of times in succession by the inside identification device, the control device gives a notification indicating an abnormality.

6. The self-driving device control system according to claim 1, wherein the control device is further configured to determine an in-area worker count, which indicates how many workers are in the entry restricted area, based on the entry identification information and the exit identification information stored in the storage device, and give a notification indicating the in-area worker count.

7. The self-driving device control system according to claim 1, wherein the self-driving device is an unmanned transport vehicle, wherein in response to the identification information being acquired by the outside identification device, and furthermore the unmanned transport vehicle being at a location other than a location hindering passage of the worker, the control device sets the unmanned transport vehicle to the stopped state, and wherein in response to setting the unmanned transport vehicle to the stopped state, the control device sets the state of the closing member to the passage permitted state, in which passage of the worker through the at least one entrance is permitted.

* * * * *